United States Patent [19]

Abe et al.

[11] Patent Number: 4,942,096
[45] Date of Patent: Jul. 17, 1990

[54] POLYPROPYLENE RESIN COMPOSITION

[75] Inventors: Masaru Abe, Osaka; Yoichi Kawai, Kanagawa; Takashi Miyazaki, Tokyo, all of Japan

[73] Assignee: Mitsui Toatsu Chemicals, Inc., Tokyo, Japan

[21] Appl. No.: 437,693

[22] Filed: Nov. 17, 1989

[30] Foreign Application Priority Data

Nov. 22, 1988 [JP] Japan ................ 63-293466

[51] Int. Cl.$^5$ ............... C08L 51/06; C08L 23/16; B32B 27/08; B32B 27/28
[52] U.S. Cl. .................. 428/476.1; 428/516; 525/74; 525/78; 525/57; 525/179; 524/504
[58] Field of Search ............. 525/74, 78; 428/476.1, 428/516

[56] References Cited

U.S. PATENT DOCUMENTS

| | | | |
|---|---|---|---|
| 4,058,647 | 11/1977 | Inoue et al. | 428/474 |
| 4,198,327 | 4/1980 | Matsumoto et al. | 525/74 |
| 4,510,286 | 4/1985 | Liu | 525/74 |
| 4,562,230 | 12/1985 | Fukui et al. | 525/74 |
| 4,735,988 | 4/1988 | Takada et al. | 524/504 |
| 4,774,144 | 9/1988 | Jachec et al. | 525/74 |

FOREIGN PATENT DOCUMENTS

| | | | |
|---|---|---|---|
| 2522331 | 9/1983 | France | 525/74 |
| 1062544 | 3/1986 | Japan | 525/74 |

Primary Examiner—Carman J. Seccuro
Attorney, Agent, or Firm—Burns, Doane, Swecker & Mathis

[57] ABSTRACT

The present invention relates to a polypropylene resin composition useful as an adhesive comprising (A) from about 51 wt. % to about 99 wt. % of a modified polypropylene resin graft-modified with a radical-polymerizable polar unsaturated compound or a mixture of the modified polypropylene resin graft-modified with a radical polymerizable polar unsaturated compound with an unmodified polypropylene resin, (B) a substantially non-crystalline α-olefin copolymer, and (C) an ethylene/α-olefin coplymer having a density of from about 0.860 g/cm$^3$ to less than about 0.910 g/cm$^3$, a n-hexane insolubility of at least about 50 wt. % and a melting point of at least 100° C., wherein the combined weights of components (B) and (C) is from about 1 wt. % to about 49 wt. %, and the weight ratio of (B)/(C) is from about 1/99 to about 99/1. The resin composition is particularly suitable for bonding a polypropylene resin layer and an ethylene/vinyl alcohol copolymer layer, and a polypropylene resin layer and a nylon layer.

12 Claims, No Drawings

POLYPROPYLENE RESIN COMPOSITION

BACKGROUND OF THE INVENTION

1. Field of the Invention

The present invention relates to a polypropylene resin composition useful as an adhesive, and more particularly, to a polypropylene resin composition useful as an adhesive for bonding a polypropylene resin layer and an ethylene/vinyl alcohol copolymer layer or a nylon layer.

2. Description of the Related Art

Laminates comprising a polypropylene resin layer and an ethylene/vinyl alcohol copolymer layer, or a polypropylene resin layer and a nylon layer, are low in oxygen permeability and moisture vapor permeability and are widely used for containers for foods and medicines.

However, since adhesion between a polypropylene resin layer and an ethylene/vinyl alcohol copolymer layer or a nylon layer is poor, a molding method is generally employed wherein a bonding layer is placed between the resin layers by co-extrusion to laminate the layers.

It is well known that polyolefin resins graft-modified with an unsaturated carboxylic acid or derivatives thereof may be used as a bonding layer (see for example Japanese patent application Laid-Open Nos. 5527/1973, 98784/1976, and 26548/1977). It is also known that the bonding strength between the resin layers may be improved by adding a low-density polyethylene to the graft-modified polyolefin resin (see for example Japanese Patent Publication No. 40113/1979), adding a high-density polyethylene to the graft-modified polyolefin resin (see for example Japanese Patent Publication No. 36586/1984), or adding a hydrocarbon elastomer to the graft-modified polyolefin resin (see for example Japanese Patent Publication No. 40112/1979).

When compositions prepared by adding a low-density polyethylene, an ethylene polymer, or a hydrocarbon elastomer to a graft-modified polyolefin resin are employed as an adhesive layer, their performance is inadequate. For example, when a laminate made up of a polypropylene resin layer and an ethylene/vinyl alcohol copolymer layer or a nylon layer is blow molded into a bottle, the thin section of the product is low in adhesion strength. Therefore, further improvement is sought.

SUMMARY OF THE INVENTION

The present invention overcomes the problems and disadvantages of the prior art by providing a resin composition that is particularly useful as an adhesive layer between a polypropylene resin layer and an ethylene/vinyl alcohol copolymer layer or a nylon layer. The resin composition contains a modified polypropylene resin graft-modified with a radical-polymerizable polar unsaturated compound or a mixture of the modified polypropylene resin graft-modified with a radical polymerizable polar unsaturated compound with an unmodified polypropylene resin, a substantially non-crystalline α-olefin copolymer, and a specific ethylene/α-olefin copolymer.

It is an object of the invention to provide a polypropylene resin composition that is useful as an adhesive for bonding a polypropylene resin layer and an ethylene/vinyl alcohol copolymer layer or a nylon layer.

It is a further object of the invention to provide a polypropylene resin composition that exhibits excellent bonding strength even when used to form a thin section of a product.

Additional objects and advantages of the invention will be set forth in part in the description which follows, and in part will be obvious from the description, or may be learned by practice of the invention. The objects and advantages of the invention will be realize and attained by means of the instrumentalities and combinations, particularly pointed out in the appended claims.

To achieve the objects and in accordance with the purpose of invention, as embodied and broadly described herein, the present invention provides a polypropylene resin composition that is useful as an adhesive, particularly as an adhesive for bonding a polypropylene resin layer and an ethylene/vinyl alcohol copolymer layer or a nylon layer, comprising (A) from about 51 wt. % to about 99 wt. % of a modified polypropylene resin graft-modified with a radical polymerizable polar unsaturated compound or a mixture of a modified polypropylene graft-modified with a radical polymerizable polar unsaturated compound with an unmodified polypropylene resin, (B) a substantially non-crystalline α-olefin copolymer, and (C) an ethylene/α-olefin copolymer (hereinafter abbreviated to ULDPE) having a density of from about 0.860 g/cm$^3$ to less than about 0.910 g/cm$^3$, a n-hexane insolubility of at least about 50 wt. %, and a melting point of at least about 100° C., wherein the combined weight percent of components (B) and (C) is from about 1 to about 49 wt. %, and the weight ratio of (B)/(C) is from about 1/99 to about 99/1.

The polypropylene resin composition of the invention exhibits very high bonding strength, even at a thin section of a product formed therefrom.

DESCRIPTION OF THE PREFERRED EMBODIMENTS

Reference will now be made in detail to the present preferred embodiments of the invention.

Exemplary suitable modified polypropylene resins (A) for use in the present invention include those prepared by graft-modifying a crystalline polypropylene resin such as a homopolymer of propylene or a copolymer of propylene and other α-olefins with a radical-polymerizable polar unsaturated compound such as acrylic acid, maleic acid, maleic anhydride, itaconic acid, itaconic anhydride, citraconic acid, or citraconic anhydride. Modified polypropylene resins prepared by the method described in Japanese Patent Publication No. 43045/1984, are also suitable for use in the invention.

When cost of production is taken into consideration, the modified polypropylene resin is preferably prepared in such a way that a modified polypropylene resin having a high graft ratio, i.e. a high radical-polymerizable polar unsaturated compound is first produced, and then the resulting modified polypropylene is mixed with an unmodified polypropylene resin. Although the mixing ratio varies depending on the graft ratio of the modified polypropylene resin, preferably the amount of the grafted radical-polymerizable polar unsaturated compound present in the polypropylene resin composition of the invention is from about 0.01 to about 2 wt. %, more preferably from about 0.1 to about 1 wt. % (graft content), based on the combined weight of component (A), component (B), and component (C). The inventors have found that if the graft content is less than about 0.01 wt. % or greater than about 2 wt. %, the bonding strength between the polypropylene resin layer and the ethylene/vinyl alcohol copolymer layer or the nylon layer decreases. Further, if the graft content exceeds about 2 wt. %, the resulting composition is liable to take on color, and the cost of production increases.

Although the crystalline polypropylene resin used as a raw material for the modified polypropylene resin having a high graft ratio and the unmodified crystalline polypropylene that will be subsequently mixed with the modified polypropylene may be the same or different, it is preferable that homopolymers of propylene are employed as the raw material for the modified polypropylene resin. Further, propylene copolymers containing not greater than about 10 wt. %, preferably not greater than about 8 wt. % ethylene are preferably employed as the unmodified polypropylene mixed with the modified polypropylene resin.

Exemplary suitable non-crystalline α-olefin copolymers (B) for use in the present invention, include ethylene/propylene copolymer rubber (EPR) (including ethylene/propylene/diene copolymer rubber (EPDM)), and also ethylene/butene-1 copolymer rubber (e.g., "Tafmer ® A" manufactured by Mitsui Petrochemical Industries, Ltd.), and propylene/butene-1 copolymer rubber. Many of these copolymers have a density of from about 0.86 to about 0.88 g/cm$^3$, which overlaps with the density range of the above ULDPE. However, since such copolymers are non-crystalline, the n-hexane insolubility thereof is less than about 50 wt. %, and the melting point (Tm) thereof is below about 100° C.

The ULDPE (C) employed in the present invention is preferably a copolymer of ethylene with an α-olefin having from 3 to 12 carbon atoms. Examplasy suitable α-olefin compounds include propylene, butene-1, 4-methyl-pentene-1, hexene-1, octene-1, decene-1, and dodecene-1. Preferably, the α-olefin is present in the ethylene/α-olefin copolymer in an amount of from about 2 to about 40 mol %, more preferably from about 5 to about 20 mol %.

The density of the ULDPE (component C) enployed in the present invention is from about 0.860 g/cm$^3$ to less than about 0.910 g/cm$^3$, the n-hexane insolubility is at least about 50 wt. % and the Tm is at least about 100° C. If a ULPDE having a density less than about 0.860 g/cm$^3$ is employed, the rigidity of the product obtained therefrom decreases. If a ULPDE having a density of 0.910 g/cm$^3$ or greater is employed, adhesion to the ethylene/vinyl alcohol copolymer or the nylon is low, and the bonding strength at a thin section of a product formed therefrom is inadequate. Further, if the n-hexane insolubility is below about 50 wt. %, or the Tm is below about 100° C., the rigidity of the product obtained therefrom descreases, and then the properties of the invention are not achieved.

A method for producing the ULDPE (C) enployed in the present invention will now be described.

First, the catalyst system to be enployed is formed by combining a solid catalyst component containing magnesium and titanium with an organic aluminum compound. Exenplary suitable solid catalyst components include titanium compounds supported in a known manner or metallic magnesium, magnesium hydroxide, magnesium carbonate, magnesium oxide, or magnesium chloride, a double salt, a double oxide, a carbonate, a chloride, a hydroxide or the like that contains a magnesium atom(s) and a metal selected from the group consisting of silicon, calcium and aluminum, on an inorganic solid compound containing magnesium obtained by treating or reacting the inorganic solid compound with an oxygen-containing compound, a sulfur-containing compound, an aromatic hydrocarbon, a halogen-containing compound, or the like.

Exemplary suitable oxygen-containing compounds include water, organic oxygen-containing compounds such as alcohols, phenols, ketones, aldehydes, carboxylic acids, esters, polysiloxanes and acid amides, metal alkoxides, and inorganic oxygen-containing compounds such as oxychlorides of metals.

Exmnplary suitable sulfur-containing compounds include organic sulfur-containing compounds such as thiols, and thioethers, and inorganic sulfur-containing compounds such as sulfur dioxide, sulfur trioxide, and sulfuric acid.

Exemplary suitable aromatic hydrocarbon compounds include various monocyclic and polycyclic aromatic hydrocarbon compounds such as benzene, toluene, xylene, anthracene, and phenanthrene.

Exemplary suitable halogen-containing compounds include chlorine, hydrogen chloride, metal chlorides, and organic halogenated compounds.

Exemplary suitable titanium compounds include halides, alkoxyhalides, alkoxides, halide oxides, and the like of titanium. Preferably, tetravalent titanium compounds and trivalent titanium compounds are employed. With respect to tetravalent titanium compounds, those represented by the general formula Ti(OR)$_n$X$_{4-n}$ are preferred wherein R represent an alkyl group having from 1 to 20 carbon atoms, an aryl group or an aralkyl group, X represents a halogen atom, and n is such that $0 \leq n \leq 4$. Exemplary preferred tetravalent titanium compounds include titanium tetrachloride, titanium tetrabromide, titanium tetraiodide, monomethoxytrichlorotitanium, dimethoxydichlorotitanium, trimethoxymonochlorotitanium, tetramethoxytitanium, monoethoxytrichlorotitanium, diethoxydichlorotitanium, triethoxymonochlorotitanium, tetraethoxytitanium, monoisopropoxytrichlorotitanium, diisopropoxydichlorotitanium, triisopropoxymonochlorotitanium, tetraisopropoxytitanium, monobutoxytrichlorotitanium, bibutoxydichlorotitanium, monopentoxytrichlorotitanium, monophenoxytrichlorotitanium, diphenoxydichlorotitanium, triphenoxynonochlorotitanium, and tetraphenoxytitanium.

Exemplary suitable trivalent titanium compounds include titanium trihalides obtained by reducing titanium tetrahalides such as titanium tetrachloride and titanium tetrabromide with hydrogen, aluminum, titanium or an organometallic compound of a metal of Groups I to III of the Periodic Table such as trivalent titanium compounds obtained by reducing a tetravalent alkoxy titanium chloride represented by the general formula Ti(OR)$_m$X$_{4-m}$, wherein R represents an alkyl group having from 1 to 20 carbon atoms, an aryl group, or an aralkyl group, X represents a halogen atom, and m is such that $0<m<4$, with an organometallic compound of a metal of Groups I to III of the Periodic Table.

Tetravalent titanium compounds aré particularly preferred.

Additional exemplary suitable catalyst systems include catalyst systems obtained by combining a reaction product, which is used as the solid catalyst component, of a titanium compound and an organomagnesium compound such as so-called Grignard reagents with an organoaluminum compound.

Organomagnesium compounds represented by the general formulae RMgX, R$_2$Mg, RMg(OR) or the like, wherein R represents an organic residue having from 1 to 20 carbon atoms, and X represents a halogen atom, and their ether complexes, and those obtained by modifying these organometallic compounds with other organometallic compound such as organosodium compounds, organolithium compounds, organopotassium compounds, organoboron compounds, organocalcium compounds, organozinc compounds, and organoaluminum compounds may be employed.

Other examplary suitable catalyst systems include those obtained by combining, with an organoaluminum compound, a solid substance, which is used as the solid catalyst component. An above-mentioned inorganic oxide such as SiO$_2$ and Al$_2$O$_3$ is contacted with a solid catalyst component containing at least magnesium and titanium. As the inorganic oxide, in addition to SiO$_2$ and Al$_2$O$_3$, CaO, B$_2$O$_3$ and SnO$_2$ may be employed, as well as double oxides of such compounds.

Preferred organoaluminum compounds to be combined with the above solid catalyst component include organoaluminum compounds represented by the general formulae R$_3$Al, R$_2$AlX RAlX$_2$, R$_2$AlOR, RAl(OR)X and R$_3$Al$_2$X$_3$ wherein R represents an alkyl group having from 1 to 20 carbon atoms, an aryl group, or an aralkyl group, X represents a halogen atom, and wherein R's may be the same or different, and triethylaluminum, triisobutylaluminum, trihexylaluminum, trioctylaluminum, diethylaluminum chloride, diethylaluminum ethoxide, and ethylaluminum sesquichloride, and mixtures of these compounds.

Although there is no particular limitation on the amount of the organic aluminum compound to be used, generally the organic aluminum compound is enployed in an amount of from about 0.1 to about 1000 times that of the titanium compound in terms of mol.

The copolymerization reaction is performed in the same way as common polymerization reactions of olefins using a Ziegler type catalyst. The reaction is carried out substantially without oxygen, water and the like in a vapor phase or in the presence of an inert solvent or by allowing the monomer itself to act as a solvent. Copolymerization of ethylene and an α-olefin is carried out at a temperature of from about 20° to about 300° C., preferably from about 40° to about 200° C., and at a pressure from normal pressure to about 70 kg/cm$^2$.G, preferably from about 2 to about 60 kg/cm$^2$.G. Although the molecular weight can be controlled to some extent by varying the conditions such as the copolymerization temperature and the molar ratio of the catalyst, the molecular weight can be controlled effectively by adding hydrogen to the polymerization system. A polymerization reaction including two or more steps wherein polymerization conditions such as hydrogen concentration and the polymerization temperature are different, can be carried out without any difficulty.

Measurement of the n-hexane insolubility and the Tm in the present invention was carried out as follows.
The measurement of the n-hexane insolubility A sheet having a thickness of 200 μm was formed by using a hot press. Three pieces having dimensions of 20 mm×30 mm were cut out therefrom, and extraction of the cut sheet was carried out with boiled n-hexane for 5 hours using a double tube type Soxhlet extractor. The n-hexane insoluble matter was removed, subjected to vacuum drying (in a vacuum for 7 hours at 50° C.), and then the n-hexane insolubility was calculated according to the following expression:

$$\text{n-hexane insolubility (wt. \%)} = \frac{\text{Weight of the extracted sheet}}{\text{Weight of the unextracted sheet}} \times 100$$

Measurement of the Tm

About 5 mg of a sample were weighed from a film having a thickness of 100 m μmolded by a hot press. The sample was set in a differential scanning calorimeter, and heated to 170° C. After the sample was maintained at that temperature for 15 min, the sample was cooled to 0° C. at a cooling rate of 2.5° C./min. From this state, the sample was heated to 170° C. at a heating rate of 10° C./min to carry out the measurement. The maximum temperature during heating from 0° C. to 170° C. was designated Tm.

In the present resin composition, the content of the modified polypropylene resin (A) is from about 51 wt. % to about 99 wt. %, preferably from about 58 wt. % to about 98.5 wt. %, based on the combined weights of component (A), component (B) and component (C). If the content of component (A) exceeds about 99 wt. %, the bonding strength between the adhesive layer of the present resin composition and the ethylene/vinyl alcohol copolymer layer or the nylon layer is low. If the content of component (A) is less than about 51 wt. %, the bonding strength between the adhesive layer and the polypropylene resin layer is low.

The non-crystalline α-olefin copolymer (B) and the ULDPE (C) are present in amounts such that (B)+(C) is from about 1 to about 49 wt. %, preferably from about 1.5 to about 42 wt. %, and (B)/(C) is from about 1/99 to about 99/1, preferably from about 1/49 to 49/1. If the amount of (B)+(C) is less than about 1 wt. %, the bonding strength between the adhesive layer and the ethylene/vinyl alcohol copolymer layer or the nylon layer is low. If the amount of (B)+(C) exceeds about 49 wt. %, the bonding strength between the adhesive layer and the polypropylene resin layer decreases. If (B)/(C) falls outside the range of from about 1/99 to 99/1, the bonding strength between the adhesive layer and the ethylene/vinyl alcohol copolymer layer or the nylon layer decreases particularly at the thin section of the product.

Other resins and additives may be added to the polypropylene resin composition of the invention such as moderate-low-density polyethylenes, high-density polyethylenes, ethylene/vinyl alcohol copolymers, and nylon, and antioxidants, ultraviolet absorbers, pigments, dyes, fillers, nucleating agents, anti-blocking agents, slip agents, antistatic agents, and fire retardants, provided such resins and additives are added in an amount that does not adversely effect the properties of the composition of the invention.

The resin composition of the invention may be prepare by premixing the components by a Henschel mixer or the like and melting and kneading the mixture by a uniaxial extruder, a biaxial extruder or the like to be pelletized.

To produce a laminate consisting of an ethylene/vinyl alcohol copolymer or a nylon and a polypropylene resin using the present resin composition, the following exemplary processes can be used. A method wherein films or sheets of a polypropylene layer, an ethylene/vinyl alcohol copolymer or nylon resin layer respectively, and an adhesive layer are made, and then the adhesive layer is sandwiched between other resin films or sheets followed by thermocompression bonding may be employed. A method wherein a melted adhesive layer composition is extruded onto one of a polypropylene film or sheet and an ethylene/vinyl alcohol copolymer or nylon film or sheet, and the other resin film or sheet is placed thereon may be employed. Further, a method wherein polypropylene, an ethylene/vinyl alcohol copolymer or nylon resin, and an adhesive layer composition are melted in extruders and are co-extruded through a single die may be employed.

The extrusion temperature at which the polypropylene, ethylene/vinyl alcohol copolymer or nylon resin is extruded may be an extrusion temperature conventionally used. The extrusion temperature of the adhesive layer composition is preferably from about 190° C. to about 300° C. more preferably from about 200° C. to about 280° C..

Preferably, the thickness of the adhesive layer is from about 0.005 to about 0.1 mm. If the thickness is less than about 0.005 mm, the bonding strength obtained is not sufficient. On the other hand, if the thickness is greater than about 0.1 mm, the bonding strength can not be increased.

The laminate may be in the shape of, for example, a film, a sheet, a pipe, a corrugated sheet, and a container such as a bottle that will be made for example by injection molding or blow molding. It is also possible to produce a laminate sheet and then form various containers therefrom for example by vacuum forming or air-pressure forming.

The invention will be further clarified by the following examples which are intended to be purely exemplary of the invention.

EXAMPLES

In the following description, the bonding strength was measured in accordance with JIS K-6854 (T-type peeling test), the melt index (MI) of the polypropylene and the non-crystalline α-olefin copolymer was measured in accordance with JIS K-6758, and the density was measured in accordance with JIS K-6760.

EXAMPLES 1 TO 13

350 g of crystalline polypropylene resin (propylene homopolymer having an MI of 8 g/10 min) and 3500 ml of chlorobenzene were charged into a 5 liter autoclave. The mixture was heated to 130° with stirring, and then a solution of 35 g of di-t-butyl peroxide in 140 ml of chlorobenzene and a solution of 50 g of maleic anhydride in 80 ml of acetone were charged therein for over 4 hours. After completion of the charging, stirring was continued at 130° C. for 3 hours to complete the reaction. The reaction was carried out under an atmosphere of nitrogen.

After cooling, the slurry was washed with a large amount of acetone, then filtered and dried to obtain a grafted polypropylene resin (GPP). The graft ratio of the maleic anhydride of this resin was measured by IR measurement and was found to be 11.5 wt. %.

The GPP, ethylene/propylene random copolymer (PP) having an ethylene content of 4.5 wt. % and an MI of 1.5 g/10 min, the non-crystalline olefin resin shown in Table 1, and ULDPE shown in Table 2 were blended in the proportions set forth in Table 4. To each of the obtained blends were added 0.3 parts by weight of calcium stearate, 0.25 parts by weight of tris(2,4-di-t-butylphenyl)phosphite, and 0.3 parts by weight of pentaerythrityl-tetrakis [3-(3,5-di-t-butyl-4-hydroxyphenyl)propionate]. The components were mixed by a Henschel mixer, and each of the mixtures was pelletized at 230° C. by a 40-mm φ uniaxial extruder to obtain a resin composition for an adhesive layer.

Each of the resin compositions obtained above, polypropylene (having an MI of 1.0 available under the trade name "Mitsui Noblen MJS-G" from Mitsui Toatsu Chemicals Inc.), and ethylene/vinyl alcohol copolymer (having an MI of 1.3 available under the trade name "Eval ® F" from Kuraray Co., ltd.) were co-extruded by a feed block die into three resins and five layers, i.e., a polypropylene layer/an adhesive layer/an ethylene/vinyl alcohol copolymer layer/an adhesive layer/a polypropylene layer thereby forming each parison with an outer diameter of 39 mm φ and a thickness of 4 mm, and the parison was molded by blow molding (at an air pressure of 5.0 kg/cm²) into a container having a volume of 850 cc (the product weight: 56 g, and the outer diameter: 90 mm φ). In the feeding of the resins into the feed block, a 40-mm φ extruder was used for the polypropylene layer, a 30-mm φ extruder was used for the adhesive layer composition, and a 30-mm φ extruder was used for the ethylene/vinyl alcohol copolymer layer.

The extrusion temperature for each resin was 200° C. and the extrusion temperature of the die section and the feed block section was also 200° C.

The side wall section of the container was removed, and the peel strength was measured.

The thickness where the peel strength was measured was as follows: the polypropylene layer/the adhesive layer/the ethylene/vinyl alcohol copolymer/the adhesive layer/the the polypropylene layer=0.45/0.03/0.04/0.03/0.4 mm.

The results are set forth in Table 4.

Comparative Examples 1 to 7

Examples 1 to 13 were repeated, but the compositions used were as shown in Table 5, and in Comparative Examples 3 to 4, the polyethylenes (PE) shown in Table 3 were used.

The results are set forth in Table 5.

TABLE 1

| | Propylene content (wt. %) | MI (g/10 min) | |
|---|---|---|---|
| B-1 | 26 | 2.7 | EP-02P produced by Japan Synthetic Rubber Co., Ltd. |
| B-2 | 27 | 0.7 | EP-07P produced by Japan Synthetic Rubber Co., Ltd. |

TABLE 2

| | α-Olefin | Density (g/cm³) | MI (g/10 min) | Tm (°C.) | n-Hexane insoluble (wt. %) | |
|---|---|---|---|---|---|---|
| C-1 | Propylene | 0.897 | 2.5 | 121 | 68 | NIPPON PETROCHEMICALS, CO., LTD. |
| C-2 | Butene-1 | 0.901 | 1.2 | 121 | 82 | NIPPON PETROCHEMICALS, CO., LTD. |
| C-3 | Butene-1 | 0.906 | 0.8 | 122 | 88 | NIPPON PETROCHEMICALS, CO., LTD. |

TABLE 3

| | α-Olefin | Type | Density (g/cm³) | MI (g/10 min) | Tm (°C.) | |
|---|---|---|---|---|---|---|
| D-1 | | HDPE | 0.956 | 1.0 | 129 | NIPPON PETROCHEMICALS, CO., LTD. |
| D-2 | | LDPE | 0.924 | 1.0 | 109 | NIPPON PETROCHEMICALS, CO., LTD. |
| D-3 | Butene | L-LDPE | 0.923 | 1.1 | 122 | NIPPON PETROCHEMICALS, CO., LTD. |

TABLE 4

| | | | Ex. 1 | Ex. 2 | Ex. 3 | Ex. 4 | Ex. 5 | Ex. 6 | Ex. 7 | Ex. 8 | Ex. 9 | Ex. 10 | Ex. 11 | Ex. 12 | Ex. 13 |
|---|---|---|---|---|---|---|---|---|---|---|---|---|---|---|---|
| Composition (wt. %) | PP | | 77 | 87 | 67 | 57 | 77 | 77 | 77 | 75 | 95.4 | 77 | 77 | 77 | 77 |
| | GPP | | 3 | 3 | 3 | 3 | 3 | 3 | 3 | 5 | 3 | 3 | 3 | 3 | 3 |
| | Non-crystalline | B-1 | | | | | 10 | | | | — | | | | |
| | α-olefin copolymer | B-2 | 10 | 5 | 20 | 20 | | 10 | 10 | 10 | 0.8 | 2 | 5 | 15 | 18 |
| | ULDPE | C-1 | 10 | 5 | 10 | 20 | 10 | | | 10 | 0.8 | 18 | 15 | 5 | 2 |
| | | C-2 | | | | | | 10 | | | — | — | — | — | — |
| | | C-3 | | | | | | | 10 | | — | — | — | — | — |
| | PE | D-1 | | | | | | | | | — | — | — | — | — |
| | | D-2 | | | | | | | | | — | — | — | — | — |
| | | D-3 | | | | | | | | | — | — | — | — | — |
| Peel Strength (kg/cm) | | | 2.2 | 1.7 | 2.3 | 2.0 | 1.8 | 1.7 | 1.7 | 2.4 | 1.4 | 2.0 | 2.1 | 2.2 | 2.2 |

TABLE 5

| | | | Com. ex. 1 | Com. ex. 2 | Com. ex. 3 | Com. ex. 4 | Com. ex. 5 | Com. ex. 6 | Com. ex. 7 |
|---|---|---|---|---|---|---|---|---|---|
| Composition (wt. %) | PP | | 77 | 77 | 77 | 77 | 77 | 96.4 | 40 |
| | GPP | | 3 | 3 | 3 | 3 | 3 | 3 | 3 |
| | Non-crystalline | B-1 | | | | | | | |
| | α-olefin copolymer | B-2 | 20 | | | 10 | 10 | 0.3 | 28.5 |
| | ULDPE | C-1 | | 20 | | | | 0.3 | 28.5 |
| | | C-2 | | | | | | | |
| | | C-3 | | | | | | | |
| | PE | D-1 | | | | 10 | | | |
| | | D-2 | | | | | 10 | | |
| | | D-3 | | | | | | 10 | |
| Peel Strength (kg/cm) | | Part A | 0.8 | 0.6 | 0.75 | 0.75 | 0.85 | 0.4 | 0.5 |

EXAMPLE 14

Example 1 was repeated, except that instead of the ethylene/vinyl alcohol copolymer used in Example 1 "UBE nylon 1011" (manufactured by Ube Industries, Ltd.) was employed. The extrusion temperature of the nylon was 250 na, that of the feed block was 250 nc and that of the die was 245 nh, thereby carrying out the test. The thickness of the section where the peel strength had been measured was such that the polypropylene layer/the adhesive layer/the nylon layer/the adhesive layer/the polypropylene layer 0.45/0.04/0.03/0.04/0.4 mm. The peel strength was 2.8 kg/cm.

When the present resin composition is used as an adhesive layer, the bonding strength between a polypropylene layer and an ethylene/vinyl alcohol copolymer layer or a nylon layer can be made very high, and when the laminate using the present polypropylene composition is molded for example by blow molding or vacuum forming, the thus produced container is high in bonding strength even at the thin wall section.

Other embodiments of the invention will apparent to those skilled in the art from consideration of the specification and practice of the invention disclosed herein. It is intended that the specification and examples be considered as exemplary only, with a true scope and spirit of the invention being indicated by the following claims.

What is claimed is:

1. A polypropylene resin composition useful as an adhesive comprising (A) from about 51 wt. % to about 99 wt. % of a modified polypropylene resin graft-modified with a radical-polymerizable polar unsaturated compound or a mixture of said modified polypropylene resin graft-modified with a radical-polymerizable polar unsaturated compound with an unmodified polypropylene resin, (B) a substantially non-crystalline α-olefin copolymer, and (C) an ethylene/α-olefin copolymer having a density of from about 0.860 g/cm³ to less than about 0.910 g/cm³, a n-hexane insolubility of at least 50 wt. % and a melting point of at least about is 100° C., wherein the weight ratio of (B)/(C) is from about 1/99 to about 99/1.

2. A polypropylene resin layer and an ethylene/vinyl alcohol copolymer layer bonded together with the propylene resin composition of claim 1.

3. A polypropylene resin layer and a nylon layer bonded together with the polypropylene resin composition of claim 1.

4. The polypropylene resin composition of claim 1 wherein said radical-polymerizable polar unsaturated compound is selected from the group consisting of acrylic acid, maleic acid, maleic anhydride, itaconic acid, itaconicanhydride, citraconic acid and citraconic anhydride.

5. The polypropylene resin composition of claim 4 wherein said radical-polymerizable polar unsaturated compound is maleic anhydride.

6. The polypropylene resin composition of claim 1 wherein said substantially non-crystalline α-olefin copolymer (B) is selected from the group consisting of an ethylene/propylene copolymer rubber and a propylene/butene-1 copolymer rubber.

7. The polypropylene resin composition of claim 1 wherein said grafted radical polymerizable polar unsaturated compound is present in the polypropylene resin composition in an amount of from about 0.01 wt. % to about 2.0 wt. % based on the combined weights of component (A), component (B), and component (C).

8. The polypropylene resin composition of claim 1 wherein said unmodified polypropylene resin is a propylene copolymer containing not greater than about 10 wt. % ethylene.

9. The polypropylene resin composition of claim 1 wherein α-olefin is present in said ethylene/α-olefin copolymer in an amount of from about 2 mol % to about 40 mol %.

10. The polypropylene resin composition of claim 1 wherein component (A) is present in an amount of from about 58 wt. % to about 98.5 wt. %, the combined weight of component (B) and component (C) is from about 1.5 to about 42 wt. %, and the weight ratio of (B)/(C) is from about to 1/49 to 49/1.

11. The polypropylene resin composition of claim 1 further comprising at least one additive.

12. The polypropylene resin composition of claim 11 wherein said additive is selected from the group consisting of moderate-low-density polyethylene compounds, high-density polyethylene compounds, ethylene/vinyl alcohol copolymers, nylon, antioxidants, ultraviolet absorbers, pigments, dyes, fillers, nucleating agents, anti-blocking agents, slip agents, antistatic agents and fire retardants.

* * * * *